United States Patent [19]

Kunzmann et al.

[11] Patent Number: 4,819,339
[45] Date of Patent: Apr. 11, 1989

[54] METHOD OF MEASURING ROTARY-TABLE DEVIATIONS

[75] Inventors: Horst Kunzmann, Braunschweig; Karl Schepperle, Oberkochen; Gerhard Trieb, Konigsbronn; Franz Wäldele, Braunschweig, all of Fed. Rep. of Germany

[73] Assignee: Carl-Zeiss-Stiftung, Heidenheim/Brenz, Fed. Rep. of Germany

[21] Appl. No.: 116,509

[22] Filed: Nov. 2, 1987

[30] Foreign Application Priority Data

Nov. 3, 1986 [DE] Fed. Rep. of Germany ....... 3637410

[51] Int. Cl.[4] .............................................. G01B 7/03
[52] U.S. Cl. ...................... 33/503; 33/1 N; 33/1 S
[58] Field of Search ................. 33/502, 504, 503, 520, 33/568, 569, 570, 549, 550, 551, 1 M, 1 S

[56] References Cited

U.S. PATENT DOCUMENTS

| 4,080,741 | 3/1978 | Siddall et al. ........................ 33/502 |
| 4,369,581 | 1/1983 | Lenz ................................... 33/169 C |
| 4,695,982 | 9/1987 | Preysman ............................ 33/504 |

OTHER PUBLICATIONS

"Test of the Three-Dimensional Uncertainty of Machine Tools ... ", W. Knapp, Annals of the CIRP, vol. 32/1/1983, pp. 459–464.

"Einbindung von Drehkoordinaten in Koordinatenmessgerate", W. Lotze, et al., Feingeratetechnik 31 (9/1982), pp. 394–397.

"Prufkorper fur Koordinatenmessgerate, Werkzeugmaschinen ... ", H. H. Schussler, Technisches Messen 51 (1/1984), pp. 83–95.

"Zweidimensionale Prufkorper zur Ermittlung der Messtechnischen Eigenschaften von Koordinatenmessgeraten", Kunzmann et al., Technische Universitat, Wien, Apr. 2–4, 1986, pp. 1–27.

Primary Examiner—William D. Martin, Jr.
Attorney, Agent, or Firm—Hopgood, Calimafde Kalil, Blaustein & Judlowe

[57] ABSTRACT

The four components of the deviations of a rotary table from an ideal axis of rotation can be obtained by a single measuring method wherein a test body (4) having a plurality of well-defined measurement points is placed on the rotary table (1) and the positions of said measuring points are then determined by means of a coordinate-measuring instrument (3), for each of various angular positions of the rotary table, there being thus a set of ascertained measurement-point coordinates for each of the angular positions of the rotary table. From the sets of measurement-point coordinates, the travel deviations $f_a$, $f_r$ and $f_t$ of the axis of rotation, and the angle-position deviation $p_w$ are then determined by calculation.

12 Claims, 2 Drawing Sheets

METHOD OF MEASURING ROTARY-TABLE DEVIATIONS

BACKGROUND OF THE INVENTION

Rotary tables are being increasingly used to mount workpieces on coordinate-measuring instruments, since certain measurement tasks on the workpieces can be carried out more easily with the aid of a rotational axis as the fourth axis of measurement. For such a use it is necessary, however, that the angle values given by the rotary table and deviations of the rotary-table axis from an ideal axis of rotation be as posssible as small and that they do not increase the measurement uncertainty of the coordinate-measuring instrument. A summary of the problems inherent in such use of rotary tables is given in the paper, "Accuracy Specifications of Rotary Tables and Particulars on Their Use on Coordinate-Measuring Machines", by H. J. Neumann in VDI-Berichte 529 (1984).

The deviations of a rotary table can be broken down into the following components:
1. deviations of angular position
2. deviations in travel of the rotary axis
   (a) axial deviation
   (b) radial deviation
   (c) wobble deviation These four components are regularly measured in the course of the acceptance testing of a rotary-table unit.

It is also already known to store the measured systematic angular position deviations of a rotary-table unit and take them into account as correction values in the calculation of the measurement results. If rotary table deviations are to be used for computational correction of measurement values, then not only the maximum value of each error component but the variation thereof as a function of the angle of rotation must, however, be measured. For this purpose, very different measuring methods have thus far been used.

To measure deviation in angular position, calibrated angle standards, preferably in the form of polygonal mirrors, are placed on the rotary table, the mirror surfaces of said mirrors with respect to their angular position being precisely known. Measurement of the angular position of the rotary table is then effected by observation of the mirror surfaces, using an auto-collimating telescope.

To determine axial deviation in travel of the axis of rotation, a ball is fixedly mounted at the center of the rotary table, or a flat disk is mounted perpendicular to the axis of rotation of the rotary table and is scanned continuously or at different angular positions by an inductive scanner that is positioned in the axis of rotation.

Radial deviation in travel is determined by scanning a centrally clamped cylinder or ring with a radially oriented path recorder, i.e., in an arrangement known in principle from roundness-test devices.

Finally, for the measurement of wobble deviation, a flat mirror is mounted on the rotary table with its surface perpendicular to the axis or rotation and is measured with an auto-collimating telescope; alternatively, two path recorders are oriented as for measurement of radial travel deviation, the recorders being axially offset from each other and being used in a difference circuit.

Until now, the acceptance testing of rotary-table units has been a tedious process, requiring a large amount of time and personnel, since a different measurement structure is used for each of the indicated components. As a consequence, rotary tables which have thus far been used have not been recalibrated at the situs of use of the coordinate-measuring instrument, nor have the calibration values been adapted as stored values for computational correction for the actual travel and position deviations. Such recalibration is, however, necessary under certain conditions since, in particular, systematic travel deviations of the axis of rotation are not completely stable over a long time but are subject to changes, due to running-in effects.

From Federal Republic of Germany OS 2,940,633 it is known, in order to determine the position of the axis of rotation of a rotary table on a coordinate-measuring instrument, to mount a measurement point on the rotary table and to determine the position of the measurement point for each of three angular table positions about the axis of rotation. By this method, however, only the average position of the axis of rotation can be determined but not its travel or position deviation.

BRIEF DESCRIPTION OF THE INVENTION

It is the object of the present invention to provide a method for measurement of rotary-table deviations which takes as little time as possible and requires a minimum of measurement means.

The invention achieves this object, with a rotary table mounted within the measurement volume of a coordinate-measuring instrument, by the following steps:

securing a test body on the rotary table, the test body providing a plurality of contactable surfaces from which a plurality of well-defined measurement points can be established by probe contact;

the measurement points are ascertained, for different angular positions ($\alpha_i$) of the rotary table, in each case using the work-contacting probe of the coordinate-measurement instrument; and the rotary table deviations ($p_w$, $f_a$, $f_r$, $f_t$) are calculated from the sets of measurement-point coordinates which are associated with the corresponding angular positions ($\alpha_i$).

In the method of the invention, only a single measuring means, namely, the coordinate-measuring instrument itself, is used, whether the rotary table is a built-in component of the measuring instrument or is an accessory unit that is optionally added to an existing measuring instrument. The test-body measurements, for different angular positions of the table and and in one measurement pass, yield data sets from which all four of the above-mentioned components of rotary-table deviation can be determined simultaneously.

The method of the invention readily lends itself to automation since, aside from placing the test body on the rotary table, no substantial manipulations need be performed. Probe contact of the measurement points and rotation of the table can be effected under program control, and the component deviations calculated from the data sets can be transferred directly as correction parameters in corresponding memories in the computer of the coordinate-measuring instrument. The measurement method can therefore be performed at the situs of use of the coordinae-measuring instrument, as for example by service personnel of the manufacturer or even of the customer, since no complicated or separate measurement devices are needed.

The test body is advisedly a plate having a plurality of balls distributed in a plane, preferably uniformly distributed with respect to a center point. Such ball plates are known per se. However, it is also possible to use test bodies of different geometry or having other contactable features.

DETAILED DESCRIPTION

The invention will be described in detail in conjunction with the accompanying drawings, in which.

Figure 1:
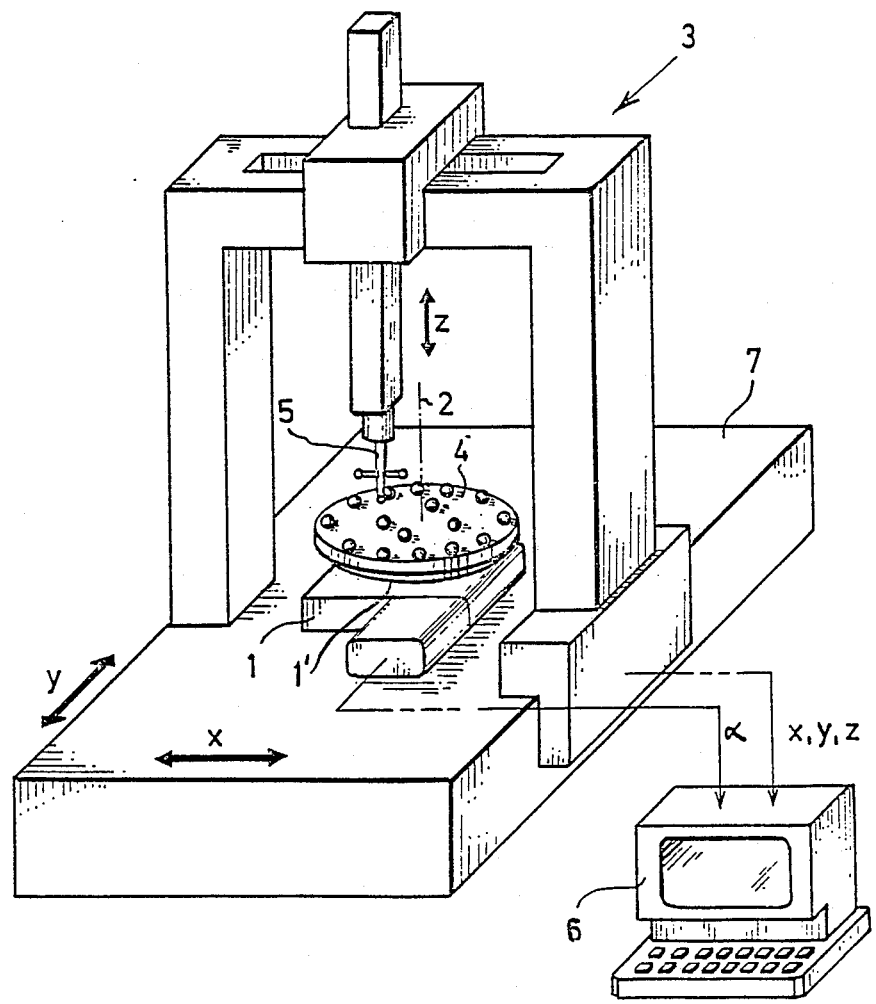
FIG. 1 is a simplified isometric diagram of a coordinate-measuring instrument with a rotary table and test body, adapted for performing the method of the invention.

In FIG. 1, travel and position deviations are to be measured for the rotary table 1' of a rotary-table unit 1, shown supported on the base 7 of a multiple-coordinate measuring instrument 3. The instrument 3 is operable in the three axes x, y, z and carries a work-contact or work-sensing probe 5. The rotary-table unit will be understood to be motor-driven and to include a photoelectrically readable circular scale for angle-positioning and angle-measurement of the rotary table 1' about its axis, which is oriented substantially parallel to the z-coordinate of the coordinate-measuring instrument. The coordinate-measurement instrument has its own control computer 6, shown with schematic x, y, z connection to the instrument and with angle-measuring and control connection α to the rotary-table unit.

For measurement of rotary-table deviations, a test body 4 is mounted on the rotary table 1'. Test body 4 is in the form of a plate having a plurality of balls distributed as uniformly as possible on the surface of the plate. The center points of these balls represent measurement points whose coordinates are determined by multiple contacting of each ball with the probe 5 of the coordinate-measuring instrument. It will be understood that, instead of the balls, contact surfaces of different geometry can alternatively be used for the measurement points. The essential thing is merely that each of the contact surfaces unequivocally defines a measurement point.

The number of measurement points represented by the balls can be selected as desired. However, the number should be at least three so that, as will be shown further below, all deviations of the rotary table can be ascertained. Nor is the distribution of the measurement points or the exact location of the measurement points with respect to each other of importance. The balls must, however, be of a quality (sphericity) which is customary for test bodies so that the measurement points which they represent are reproducible with sufficient precision.

Figure 2:
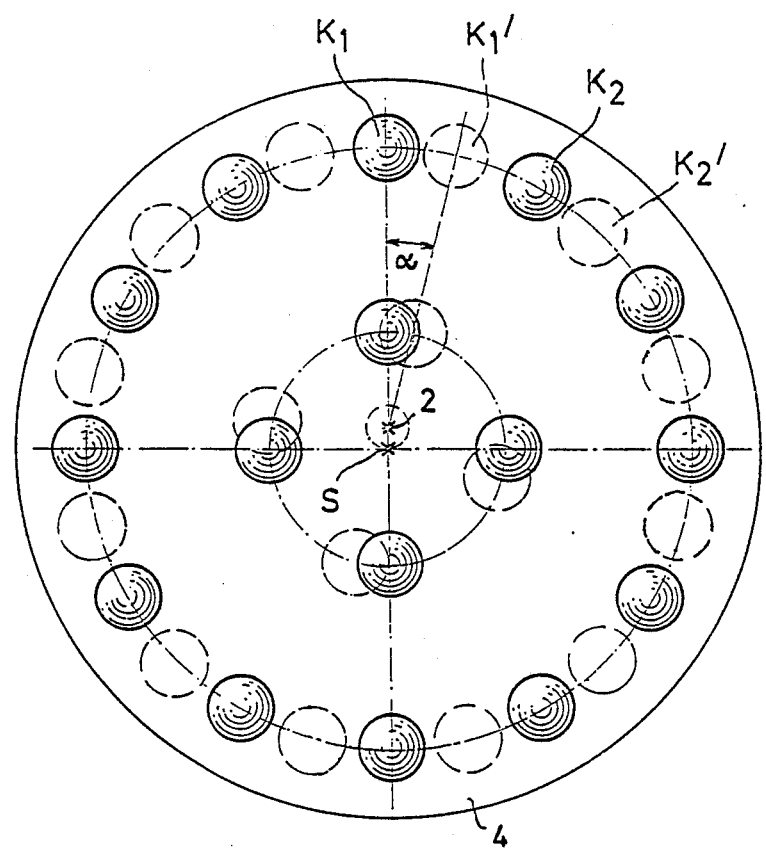
FIG. 2 is a plan view of the test body of FIG. 1, on an enlarged scale.

Referring to FIG. 2, the test body 4 will be seen to comprise a round steel plate, illustratively having a thickness of about 25-mm and a diameter of about 400-mm, and with twelve balls in spaced distribution at an outer radius and four balls in spaced distribution at an inner radius, symmetrically about a common center point S. For these dimensions, the diameter of the balls is about 30-mm, and they prove a set of sixteen measurement points, for each of a plurality of incrementally indexed angular positions of the rotary table; it will be understood that each measurement point can be ascertained and stored via computer 6 from a ball-contacting program of, say, four spaced contacts with each ball, wherein one of the contacts is offset from the plane defined by the other three contacts.

The coordinates of these sixteen measurement points are now measured by the measuring instrument 3 for different angular positions of the rotary table. For this purpose, the rotary table 1' is successively indexed in equal increments, of say 5°, until achievement of one or two full revolutions (360° or 720°), as well as a certain amount therebeyond. In general, the period of the systematic travel deviations, and therefore the number of required full revolutions, will depend on the specific construction of the rotary-table unit. Measurement over two complete revolutions is particularly necessary in the case of rotary tables which are mounted on antifriction bearings since in such case the systematic travel deviations frequently show a period of more than 720°.

The set of measurement-point coordinates measured for each angle position is transmitted to and stored in the computer 6 of the coordinate-measuring instrument.

The course of measurement which has just been described can take place automatically in accordance with a predetermined program, once the test body 4 has been mounted on the rotary table 1'. This program results in i sets of cartesian-coordinate data, wherein 16 measurement points are stored in the memory of the computer for each data set, i being the number of angular positions in which the measurement points have been recorded, e.g., with angular steps of $\Delta\alpha = 5°$ over two complete revolutions, 144 data sets are obtained. From these data sets, it will now be explained how all four components of the rotary-table deviations can be ascertained by means of computer programs.

AXIAL TRAVEL DEVIATION

In the calculation of axial-travel deviation $f_a(\alpha)$, the computer 6 of the coordinate-measuring instrument derives the centroid of the 16 measurement points of each data set. In one uses a test body 4 having uniform distribution of the measurement points (and not having excessively large centering errors), the variation of the z-coordinate of the centroid, as a function of the angle of rotation, directly represents the axial travel deviation of the rotary table. And if one uses a test body 4 having unequal distribution of the measuring points, the influence of the wobble deviation ($f_t(\alpha)$) must also be determined, the wobble deviation being (for each data set) the eccentric-offset distance of the centroid from the axis of rotation of the rotary table, wherein said offset distance is in an x-y plane, perpendicular to the axis of rotation. This ascertained eccentric-offset distance value is then used by the computer to correctively eliminate wobble deviation in the z-coordinate measurement of axial-travel deviation.

RADIAL-TRAVEL DEVIATION

In the calculation of radial-travel deviation $f_r(\alpha)$, the computer 6 forms the area centroid of the measurement points for each data set. This area centroid, which coincides with the center point designated S in FIG. 2, does not in general lie precisely on the axis 2 of rotation of the rotary table 4, and it therefore describes a circle in the course of a rotation of table 4. Deviations of the centroid center point $S(\alpha)$, determined for the data sets from a computer-generated best-fitting circle, give the radial-travel deviation $f_a(\alpha)$.

WOBBLE DEVIATION

In the calculation of wobble deviation $f_t(\alpha)$, the computer 6 determines for each data set a plane which best fits the 16 measurement points of the data set. The surface normals to these planes describe a cone, due to a not precisely orthogonal clamping of the test body on the rotary table. The wobble deviation $f_t(\alpha)$ is represented by the deviations of the surface normals from the cone.

The "surface centroid", "mean value", "circle fitting", and "cone fitting" programs necessary for the calculation of the travel deviations are part of the standard software of a coordinate-measuring instrument so that they need not now be further treated.

ANGULAR-POSITION DEVIATION

Angular-position deviation is the error component of greatest importance in rotary tables, since it directly affects the result of the measurement when the rotary table is used for angular measurements on the coordinate-measuring instrument (as for example, when testing the indexing of a gear-tooth workpiece). In the calculation of angular-position deviation, the computer of the coordinate-measuring instrument performs a coordinate transformation. In this case, the coordinate system for a first set (i.e., which is formed by the set of measurement points which are recorded by the coordinate-measuring instrument in a first angular position of the table) is transformed by use of a purely rotary incremental-displacement operation into the coordinate system which corresponds to a second set of measurement points, recorded in a second position of angle-$\alpha$ advance from the first angular position of the table. By way of explanation, reference is had to FIG. 2 in which the measurement position for recording the second data set (i.e., the $\alpha$-transformed second data set, for each first or untransformed data set) is shown by dashed outline.

Mathematical evaluation of the determination of angle-position deviations will be described in matrix representation. In this connection, it is to be borne in mind that a two-dimensional problem is presented. Accordingly, the mathematical derivation also proceeds in a two-dimensional context. The matrices used are designated by capital letters.

1. Principles

If one determines a set of coordinates of the test-body measurement points with a coordinate-measuring instrument which has an ideal, i.e., an error-free coordinate system (for example, for the xy-measurement plane, one then obtains a first coordinate matrix (1) for a first angular position "O" of the table, and a second coordinate matrix (2) for the $\alpha$-advanced second position, namely:

$$X_O + \begin{bmatrix} x_{10} & y_{10} \\ . & . \\ . & . \\ . & . \\ x_{no} & y_{no} \end{bmatrix} \quad (1)$$

and $$X_\alpha = \begin{bmatrix} x_{1\alpha} & y_{1\alpha} \\ . & . \\ . & . \\ . & . \\ x_{n\alpha} & y_{n\alpha} \end{bmatrix} \quad (2)$$

in which n is the number of test-body measurement points.

By a linear transformation and with the aid of the rotation matrix R, the coordinates of the second position can be transferred into those of the first position, in accordance with equation (3):

$$X_\alpha = X_o \cdot R \quad (3)$$

wherein:

$$R = \begin{bmatrix} \cos \alpha_k & -\sin \alpha_k \\ \sin \alpha_k & \cos \alpha_k \end{bmatrix} \quad (4)$$

In the case of real measurements, and therefore when using coordinate-measuring instruments which as a rule have errors, systematic instrument errors must be taken taken into account. For this purpose, the following assumptions are made:

Since only a relatively small region of the coordinate system of the coordinate-measuring instrument is utilized by the measurement method of the present invention, it is valid to to assume that in this region the (local) coordinate system is linear and oblique-angled and has different measurement scale factors in the involved two axes. The matrix describing these instrument errors is the metric matrix M:

$$M = \begin{bmatrix} m_{11} & m_{12} \\ 0 & m_{22} \end{bmatrix} \quad (5)$$

with $m_{11}$ = measurement scale factor of the first axis (for example, the x-axis)

$m_{22}$ = measurement scale factor of the second axis (for example, the y-axis)

$m_{12} = \cos \phi$, where $\phi$ is the angle between the axes.

The metric matrix of a coordinate-measuring instrument which is error-free in the above sense would thus be $$M = \begin{bmatrix} 1 & 0 \\ 0 & 1 \end{bmatrix}$$

2. Measurement

Measurement of the coordinates of the test-body measurement points is effected in the real-coordinate system of the coordinate instrument, i.e., in the coordinate system having errors. As in equation (1) and equation (2), one obtains the following coordinate matrices for the real-coordinate system:

$$X_{om} = \begin{bmatrix} x^m_{10} & y^m_{10} \\ \cdot & \cdot \\ \cdot & \cdot \\ \cdot & \cdot \\ x^m_{no} & y^m_{no} \end{bmatrix} \quad (6)$$

and $$X_{am} = \begin{bmatrix} x^m_{1a} & y^m_{1a} \\ \cdot & \cdot \\ \cdot & \cdot \\ \cdot & \cdot \\ x^m_{na} & y^m_{na} \end{bmatrix} \quad (7)$$

The relationship between coordinates (equations (1), (2)) determined in an ideal coordinate system and measured coordinates in the real-coordinate system (equations (6), (7)) is produced with the aid of the metric matrix M equations (8):

$$X_{om} = X_o \cdot M \quad (8)$$
$$X_{am} = X_a \cdot M$$

Solving for $X_{am}$, using equations (3) and (8), yields:

$$X_{am} = X_{om} \cdot M^{-1} \cdot R \cdot M \quad (9)$$

wherein the raised $-1$ is to be understood here and in the following to symbolize the inversion of matrices, i.e., $M^{-1}$ is the inverse of the matrix M.

Equation (9) only applies if no deviations occur other than the deviations taken into account by the metric matrix. In actual practice, however, as a result of accidental systematic deviations which pass undetected, contradictions arise from use of the measured-coordinate values $X_{om}$ in equation (9). They should be minimized by means of the Gaussian "method of least squares". In this case, the systematic deviations not taken into account are treated as accidental.

In order to take these contradictions into account, a matrix E is introduced into equation (9):

$$X_{am} = X_{om} \cdot M^{-1} \cdot R \cdot M + E \quad (10)$$

wherein E is a matrix which contains the above-mentioned accidental undetected systematic method errors.

Taking K as a simplifying matrix, wherein:

$$K = M^{-1} \cdot R \cdot M \quad (11)$$

equation (10) becomes simplified to:

$$X_{am} = X_{om} \cdot K + E \quad (12)$$

The elements of the matrix K should now be so determined that the sum of the squares of the deviations contained in matrix E is a minimum.

3. Solution

For the solution of this mathematical problem, one can proceed from known principles (see S. Brandt: "Static Methods of Data Analyses", B I-Hochschulscripten 816, 816a (1968)). Based on the need to minimize the sum of the squares, one obtains, as the solution for K and assuming the same measurement values X:

$$K = (X_{om}^T \cdot X_{om})^{-1} \cdot X_{om}^T \cdot X_{am} \quad (13)$$

wherein the raised $T$ represents the transposed matrix. By multiplying out equation (11), one obtains the elements of the matrix K as:

$$K = \begin{bmatrix} k_{11} & k_{12} \\ k_{21} & k_{22} \end{bmatrix} \quad (14)$$

$$= \begin{bmatrix} \cos \alpha_k - \frac{m_{12}}{m_{22}} \sin \alpha_k & -\sin \alpha_k \left( \frac{m_{12}^2}{m_{11} \cdot m_{12}} + \frac{m_{22}}{m_{11}} \right) \\ \frac{m_{12}}{m_{22}} \sin \alpha_k \cos \alpha_k + \frac{m_{12}}{m_{22}} \sin \alpha_k \end{bmatrix}$$

The desired angle of rotation $\alpha_k$ is obtained from $$\cos \alpha_k = \frac{k_{11} + k_{22}}{2}, \quad (15)$$

in which connection the corresponding numerical values for K in accordance with equation (14) are to be introduced for $R_{11}$ and $R_{22}$. From equations (14) and (15), it is clear that, under the assumptions set forth above, the errors of the coordinate-measuring instrument do *not* enter into the measurement result.

Therefore, after the rotation angle $\alpha_k$ corresponding to this coordinate transformation has been determined by solving the corresponding matrix equations, the difference between this angle $\alpha_k$ (calculated from the measurement values supplied by the coordinate-measuring instrument) and the angle $\alpha_d$ (indicated by the rotary-table unit) then gives the angular-position deviation $p_w$.

The method described above in which the rotation angle $\alpha_k$ is determined by comparison of two cartesian-coordinate systems results, very surprisingly, in very precise results. The reason for this is that a large part of the machine errors of the coordinate-measuring instrument used to establish and store measuring-point data do not enter at all into the result of the measurement. Thus, the calculated angle $\alpha_k$ is independent of errors in the mutually perpendicular relation between the axes of the coordinate-measuring instrument. Different scale factors, as for example caused by different temperatures on the measurement scales of the coordinate-measuring instrument, also do not affect the result of the measurement.

Thus, the precision of the described method depends essentially on the quality of the balls of the test body, the size of the test body, the number of balls and the non-linear errors of the coordinate-measuring instrument, within the measurement range of the test body. With commercial coordinate-measuring instruments and with the test body 4 of FIG. 2, it is therefore readily possible to obtain a determination of angular position with an accuracy of better than 0.2 sec. A further increase in the number of measurement points (balls) results in few advantages, but merely increases the measurement time needed for the involved probe-contacting procedure. This time can of course be shortened if the probe head of the measurement machine permits self-centering contact at the measurement points and if one operates with a probe pin 5 which is customary for such purposes. In this connection, reference is had to the article by F. Wäldele and H. Kunzmann, entitled "The Ball Scale as Kinematic Test Body for Coordinate Measuring Instruments", VDI-Bericht 528, pages 161–177.

The angle-position deviation $p_w(\alpha)$ determined in this way can be stored in the computer 6 of the coordinate-measuring instrument, in the same way as the above-mentioned travel deviations $f_a(\alpha)$, $f_r(\alpha)$ and $f_t(\alpha)$ of the axis of the rotary table; and the stored values can be used for correction of the measurement values obtained in the normal operation of the coordinate-measuring instrument.

Figure 3:
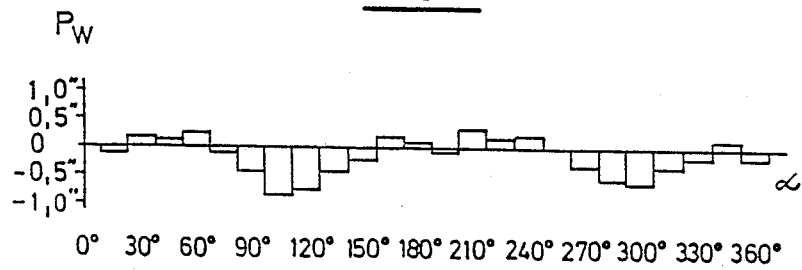
FIG. 3 is an illustrative graphical showing of measured-position deviation, for 24 different angular positions of the rotary table of FIG. 1.

FIG. 3 contains a diagram which shows, by way of example, the course of the values of angular-position deviation, measured in steps of 15°, for a mass-production rotary-table unit 1. If intermediate values are needed for the mathematical correction of table-angle position data generated by the rotary-table unit, they can be obtained by interpolation between measurement points.

The method described is, of course, not dependent on whether and to which of the axis of the coordinate-measuring instrument the rotary-table axis 2 is oriented. The axis 2 can be oriented for substantial parallelism with any of the three axes (x, y, z) of the coordinate-measuring instrument.

What is claimed is:

1. The method of using a multiple-coordinate measuring machine to calibrate a rotary table adapted to support a workpiece for measurement by said machine, wherein the machine includes a probe for measurement of the coordinates of a succession of different contacts with a workpiece, which method comprises the steps of
   (a) selecting a ball plate having at least three mutually spaced balls fixedly mounted to said plate,
   (b) mounting said plate to the rotary table so as to expose said balls for probe-contact measurement,
   (c) performing a first set of different multiple-contact measurements on each ball for a first angular position of the rotary table and calculating therefrom the positional coordinates of each ball center when in said first angular position,
   (d) repeating step (c) for each of a succeeding plurality of angularly indexed positions of the work table, for at least one complete rotation of the table,
   (e) statistically determining from the plural angularly-indexed positional coordinates of the centers of said balls, a selected one or more of a plurality of different deviations as a function of indexed angular position and for said at least one rotation, said different deviations comprising:
   axial-travel deviation, $f_a(\alpha)$,
   radial-travel deviation, $f_r(\alpha)$,
   wobble deviation, $f_t(\alpha)$, and
   angular-position deviation, $p_w$,
   (f) storing the predetermined deviation values as a function of indexed angular position; and
   (g) using the stored deviation values as corrections to coordinate measurements on a workpiece mounted to and indexed via the rotary table.

2. The method of claim 1, wherein the measuring machine has three orthogonally related machine axes of probe displacement and wherein the rotary axis of the table is oriented approximately parallel to one machine axis (z), and wherein, for a calculation of the axial-travel deviation $f_a(\alpha)$ of the rotary table, the centroid $S(\alpha)$ is determined for each set of the indexed positional coordinates of the centers of the balls, and the course of centroid position as a function of indexed angular position is determined in said one machine axis (z).

3. The method of claim 1, wherein the measuring machine has three orthogonally related machine axes of probe displacement and wherein the rotary axis of the table is approximately parallel to one machine axis (z), and wherein, for a calculation of radial-travel deviation $f_r(\alpha)$ of the rotary table, the centroid $S(\alpha)$ is determined for each set of the indexed positional coordinates of the centers of the balls, and the course of centroid position as a function of indexed angular position is determined in a plane (x, y) perpendicular to the axis of rotation (z).

4. The method of claim 3, wherein the course of the centroids $S(\alpha)$ of the coordinate sets in the plane (x, y) is determined, and eccentric displacement caused by erroneous centering of the test plate on the rotary table is determined by calculation and is eliminated from the radial-travel deviation values, prior to performing step (f).

5. The method according to claim 1, wherein for a calculation of wobble deviation $f_t$ on the rotary table, for each set of indexed positional coordinates of the centers of the balls a plane is determined which best fits the ball-center coordinates of said balls, and the normal to said plane is determined for each set of positional coordinates, and wobble is determined in terms of a deviation of said normals from a cone as a function of indexed angular position.

6. The method of claim 2, wherein, for the case of a test plate having balls of irregularly spaced distribution, a calculation of wobble deviation $f_t$ of the rotary table is made prior to the calculation of axial-travel deviation, and wherein the course of centroids $S(\alpha)$ is as a function of indexed angular position is determined in a plane (x, y) perpendicular to the axis of rotation of the rotary table, and that the influence of the wobble deviation $f_t$ is determined for the distance of each centroid from the axis of rotation of the rotary table and is taken into account in the calculation of axial-travel deviation $f_a$.

7. The method of claim 1, wherein, for a determination of angular-position deviation $p_w$, the coordinate system associated with a first set of ball-center coordinates measured in a first rotary position of the table is subjected to a purely rotational computational transformation, to the angular extent $\alpha$ which corresponds to the indexed angular increment between the rotary position of first-set measurements and the rotary position of next-set measurements, and the rotationally transformed first-set measurements are evaluated in reference to the actual next-set measurements.

8. The method according to any one of claims 2 to 6, wherein the coordinate-measuring machine is computer-controlled and deviation values determined in the individual angle positions $\alpha_i$ are entered as correction values into the computer of the machine.

9. A device for performing the method according to any one of claims 2 to 8, wherein the balls of the ball plate are in uniformly distributed relation.

10. The method of claim 1, in which step (d) is performed for at least two rotations of the table.

11. The method of using a multiple-coordinate measuring machine to calibrate a rotary table adapted to support a workpiece for measurement by said machine, wherein the machine includes a probe for measurement of the coordinates of a succession of different contacts with a workpiece, which method comprises the steps of
- (a) selecting a plate having at least three fixed and mutually spaced geometrical surface configurations, each of which configurations is contactable for unequivocal definition of a measurement point,
- (b) mounting said plate to the rotary table so as to expose said configurations for probe-contact measurement,
- (c) performing a first set of different multiple-contact measurements on each of said configurations for a first angular position of the rotary table and calculating therefrom the positional coordinates of each unequivocally defined measurement point when in said first angular position,
- (d) repeating step (c) for each of a succeeding plurality of angularly indexed positions of the work table, for at least one complete rotation of the table,
- (e) statistically determining from the plural angularly-indexed positional coordinates of said unequivocally defined measurement points, a selected one or more of a plurality of different deviations as a function of indexed angular position and for said at least one rotation, said different deviations comprising:

axial-travel deviation, $f_a(\alpha)$,
radial-travel deviation, $f_r(\alpha)$,
wobble deviation, $f_t(\alpha)$, and
angular-position deviation, $p_w$,

- (f) storing the determined deviation values as a function of indexed angular position; and
- (g) using the stored deviation values as corrections to coordinate measurements on a workpiece mounted to and indexed via the rotary table.

12. The method of claim 11, in which each of said configurations is a ball.

* * * * *